(12) United States Patent
Kern

(10) Patent No.: US 9,937,947 B1
(45) Date of Patent: Apr. 10, 2018

(54) STAND-UP STROLLER ASSEMBLY

(71) Applicant: Brenda Kern, Shiloh, IL (US)

(72) Inventor: Brenda Kern, Shiloh, IL (US)

( * ) Notice: Subject to any disclaimer, the term of this patent is extended or adjusted under 35 U.S.C. 154(b) by 0 days.

(21) Appl. No.: 15/678,235

(22) Filed: Aug. 16, 2017

(51) Int. Cl.
*B62B 9/20* (2006.01)
*B62B 7/10* (2006.01)
*B62B 9/00* (2006.01)
*B62B 9/26* (2006.01)

(52) U.S. Cl.
CPC ............... *B62B 9/20* (2013.01); *B62B 7/105* (2013.01); *B62B 9/00* (2013.01); *B62B 9/26* (2013.01)

(58) Field of Classification Search
CPC .... A61G 5/08; A61G 2005/0841; A61G 7/06; A61G 7/062; A61G 7/064; A61G 7/086; A61G 7/083; A61G 7/08; A61G 7/068; A61G 7/066; B62B 7/08; B62B 7/086; B62B 7/123; B62B 7/006; B62B 7/004; B62B 3/007; B62B 5/08; B62B 5/082; B62B 5/085; B62B 7/00; B62B 7/002
See application file for complete search history.

(56) References Cited

U.S. PATENT DOCUMENTS

| | | |
|---|---|---|
| D144,064 S | 3/1946 | Mendelson et al. |
| 5,538,267 A | 7/1996 | Pasin et al. |
| 5,839,748 A | 11/1998 | Cohen |
| 7,775,548 B2 | 8/2010 | McIntyre et al. |
| 7,878,515 B1 * | 2/2011 | Troup ................. B62B 7/10 280/47.38 |
| 8,128,118 B2 | 3/2012 | Friisedahl |
| 8,220,823 B2 * | 7/2012 | Queen ................. B62B 9/28 280/47.38 |
| 8,505,957 B2 | 8/2013 | Bizzell et al. |
| 9,096,252 B2 | 8/2015 | Thomas et al. |
| 2009/0236826 A1 * | 9/2009 | Queen ................. B62B 7/10 280/650 |
| 2011/0095510 A1 * | 4/2011 | Troup ................. B62B 7/10 280/647 |

* cited by examiner

*Primary Examiner* — John D Walters
*Assistant Examiner* — James J Triggs

(57) ABSTRACT

A stand-up stroller assembly for rolling a standing child includes a first plate and a second plate. The second plate is coupled to and extends substantially perpendicularly from a rear edge of the first plate. A seat is hingedly coupled to a first side of the second plate. A first handle is coupled proximate to a front edge of the first plate and is configured to be grasped in hands of the user, such as a child, who is positioned on the first plate between the first handle and the second plate. A second handle is coupled to a second side, proximate to a top edge, of the second plate and is configured to be clasped in hands of an operator so that the operator is positioned to locomote the first plate, and the user, upon wheels that are axially coupled to the first plate.

20 Claims, 5 Drawing Sheets

US 9,937,947 B1

STAND-UP STROLLER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

Figure 1:
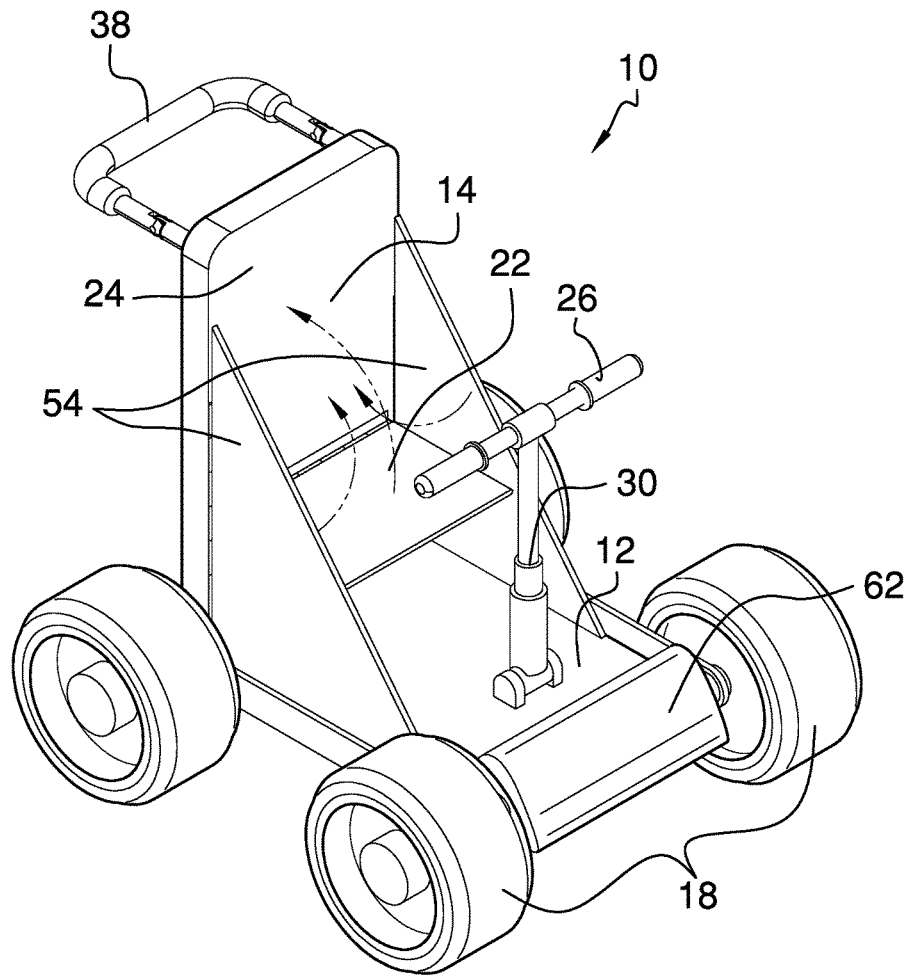

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to stroller assemblies and more particularly pertains to a new stroller assembly for rolling a standing child.

BRIEF SUMMARY OF THE INVENTION

An embodiment of the disclosure meets the needs presented above by generally comprising a first plate and a second plate. The second plate is coupled to and extends substantially perpendicularly from a rear edge of the first plate. A seat is hingedly coupled to a first side of the second plate. A first handle is coupled proximate to a front edge of the first plate and is configured to be grasped in hands of the user, such as a child, who is positioned on the first plate between the first handle and the second plate. A second handle is coupled to a second side, proximate to a top edge, of the second plate and is configured to be clasped in hands of an operator so that the operator is positioned to locomote the first plate, and the user, upon wheels that are axially coupled to the first plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric perspective view of a stand-up stroller assembly according to an embodiment of the disclosure.

Figure 2:
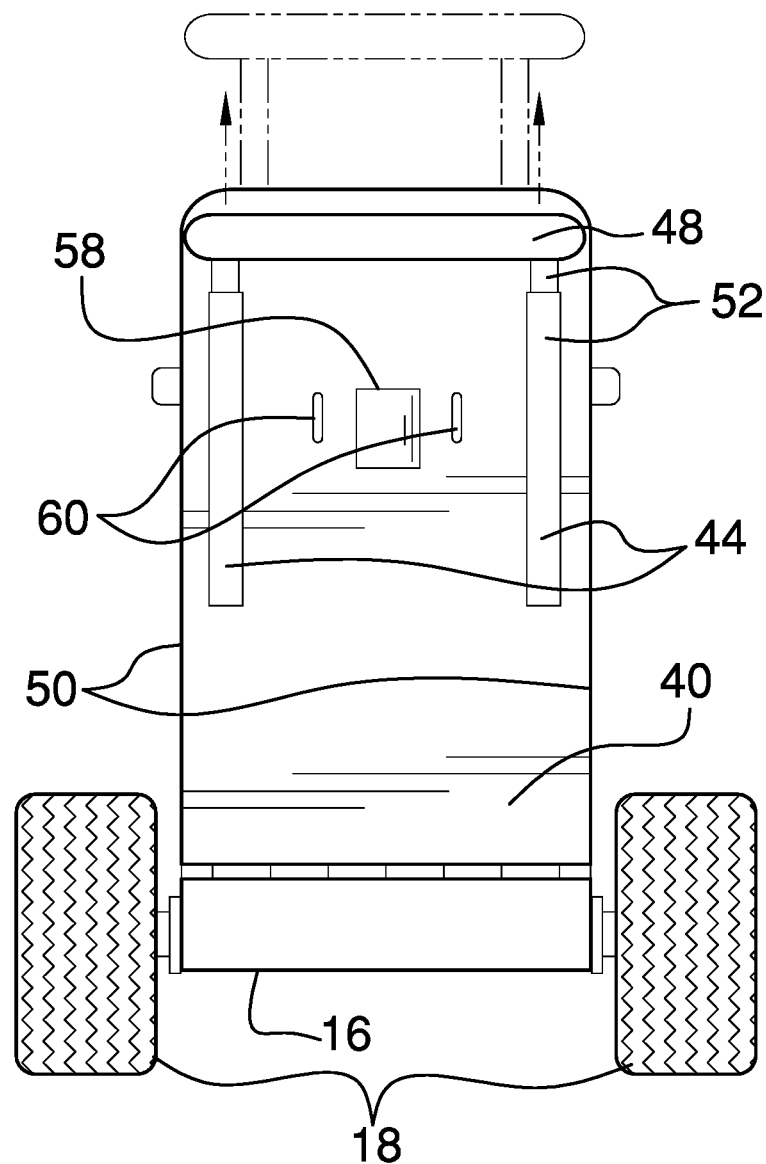
Figure 3:
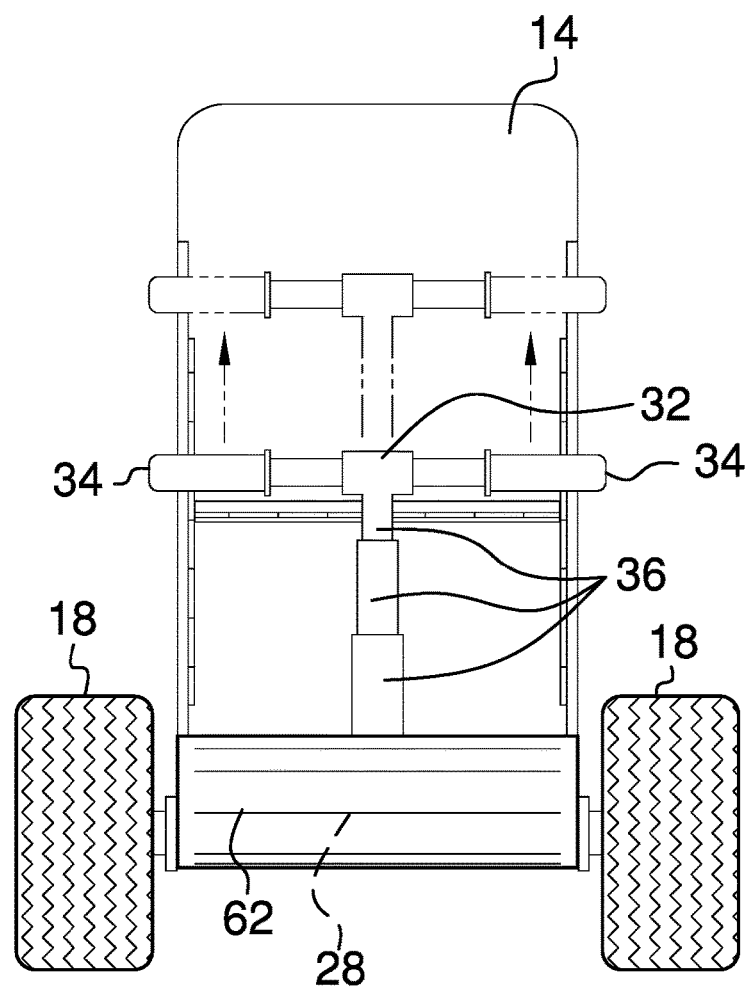
Figure 4:
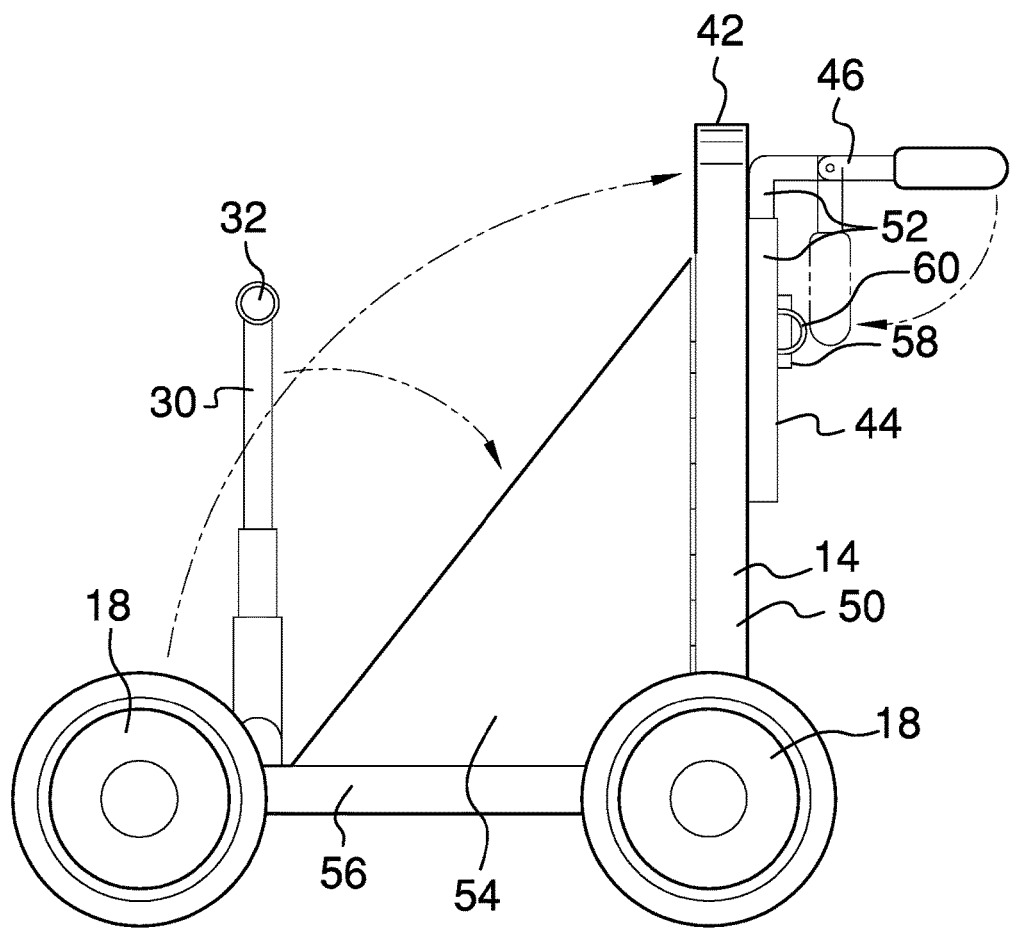
Figure 5:
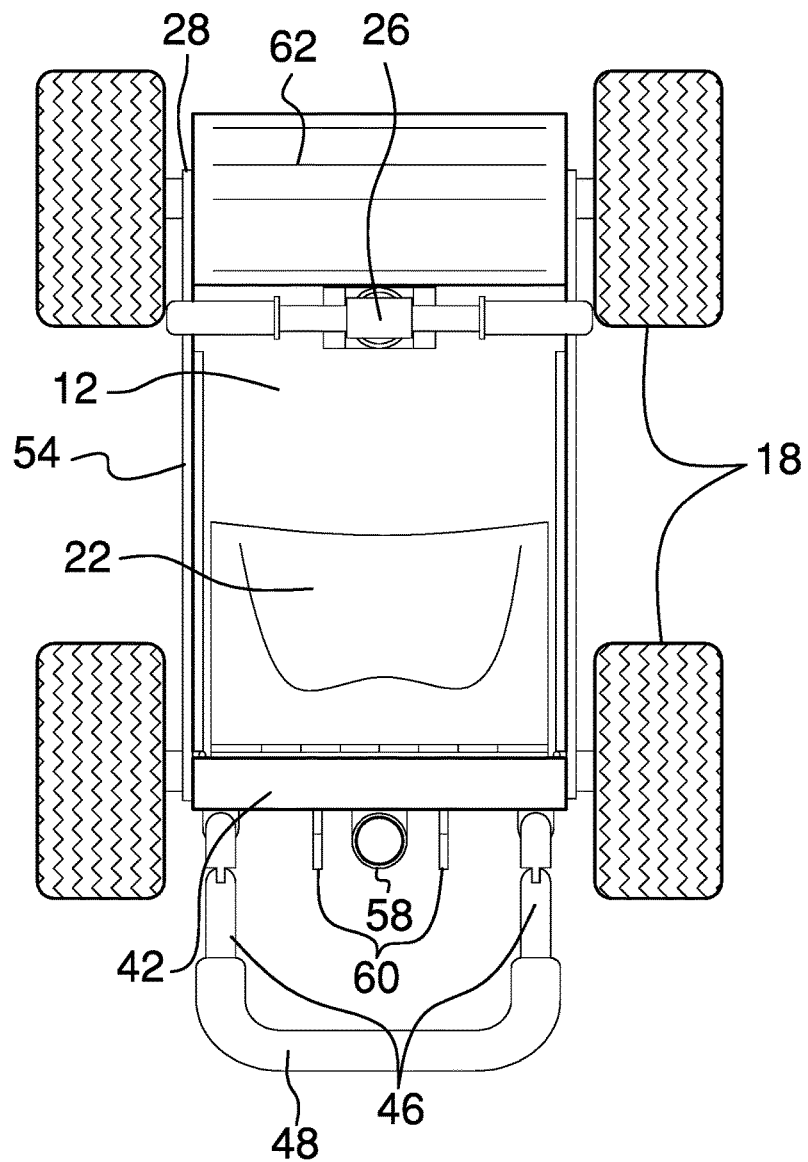

FIG. 2 is a back view of an embodiment of the disclosure.
FIG. 3 is a front view of an embodiment of the disclosure.
FIG. 4 is a side view of an embodiment of the disclosure.
FIG. 5 is a top view of an embodiment of the disclosure.

DETAILED DESCRIPTION OF THE INVENTION

With reference now to the drawings, and in particular to FIGS. 1 through 5 thereof, a new stroller assembly embodying the principles and concepts of an embodiment of the disclosure and generally designated by the reference numeral 10 will be described.

As best illustrated in FIGS. 1 through 5, the stand-up stroller assembly 10 generally comprises a first plate 12 that is rigid. A second plate 14 is coupled to and extends substantially perpendicularly from a rear edge 16 of the first plate 12. The second plate 14 also is rigid. In another embodiment, the first plate 12 and the second plate 14 are hingedly coupled. The first plate 12 and the second plate 14 are configured to be folded so that the first plate 12 and the second plate 14 are substantially adjacently positioned. In another embodiment, the first plate 12 and the second plate 14 are substantially rectangularly shaped.

A plurality of wheels 18 is axially coupled to the first plate 12. The wheels 18 are positioned on the first plate 12 such that the wheels 18 are configured to locomote the first plate 12 across a surface. In one embodiment, the plurality of wheels 18 comprises four wheels 18 that are positioned singly proximate each corner 20 of the first plate 12. In another embodiment, the wheels 18 are treaded.

A seat 22 is hingedly coupled to a first side 24 of the second plate 14. The seat 22 is selectively positionable in a resting configuration, wherein the seat 22 is substantially perpendicular to the second plate 14 and configured to seat a user. The seat 22 also is selectively positionable a stowed configuration, wherein the seat 22 is substantially parallel to and adjacent to the second plate 14.

A first handle 26 is coupled to the first plate 12 proximate to a front edge 28 of the first plate 12. The first handle 26 is configured to be grasped in hands of the user, such as a child, who is positioned on the first plate 12 between the first handle 26 and the second plate 14. In one embodiment, the first handle 26 is hingedly coupled to the first plate 12. The first handle 26 is configured to be folded to position the first handle 26 adjacent to the first plate 12. In another embodiment, the first handle 26 comprises a first rod 30 and a second rod 32. The first rod 30 is coupled to and extends substantially perpendicularly from the first plate 12. The second rod 32 is coupled to and extends bidirectionally from the first rod 30 distal from the first plate 12. The first rod 30 is positioned equally distant from opposing ends 34 of the second rod 32.

In yet another embodiment, the second rod 32 is padded proximate to the opposing ends 34. In still yet another embodiment, the first rod 30 comprises a plurality of nested sections 36 such that the first rod 30 is selectively extensible. In still yet another embodiment, the plurality of nested sections 36 comprises three nested sections 36. In still yet another embodiment, the first rod 30 and the second rod 32 are substantially circularly shaped when viewed longitudinally.

In another embodiment of the invention, each first handle 26 comprises a pair of first handles 26 such that the first handles 26 are configured to be grasped in hands of two users who are positioned on the first plate 12.

A second handle 38 is coupled to a second side 40 of the second plate 14 proximate to a top edge 42 of the second plate 14. The second handle 38 is configured to be clasped in hands of an operator so that the operator is positioned to locomote the first plate 12, and the user who is positioned on the first plate 12, upon the wheels 18.

In one embodiment, the second handle 38 comprises a pair of first bars 44, a pair of second bars 46, and a third bar 48. Each first bar 44 is coupled proximate to and extends parallel to a respective opposing edge 50 of the second plate 14 proximate to the top edge 42. Each second bar 46 is coupled to and extends substantially perpendicularly from a respective first bar 44 proximate to the top edge 42 of the second plate 14. The third bar 48 is coupled to and extends between the second bars 46 distal from the first bars 44.

In another embodiment, each first bar 44 comprises a plurality of nested segments 52 such that the first bars 44 are selectively extensible. In yet another embodiment, each plurality of nested segments 52 comprises two nested segments 52. In still yet another embodiment, the third bar 48 is padded.

Each of a pair of third plates 54 is coupled to and extends between a respective opposing edge 50 of the second plate 14 and a respective opposing side 56 of the first plate 12. The third plates 54 are positioned on the first plate 12 and the second plate 14 such that the third plates 54 are configured to retain the user on the first plate 12. In one embodiment, the third plates 54 are hingedly coupled to the second plate 14. The third plates 54 are configured to be folded to position the pair of third plates 54 adjacent to the seat 22 and the second plate 14.

The first handle 26 is configured to be folded to position the first handle 26 adjacent to the first plate 12. The third plates 54 are configured to be folded to position the pair of third plates 54 adjacent to the seat 22 and the second plate 14. The first plate 12 and the second plate 14 are configured to be folded so that the first plate 12 and the second plate 14 are substantially adjacently positioned. Thus configured, the assembly 10 is collapsible.

In one embodiment, a cup holder 58 is coupled to and extends from the second side 40 of the second plate 14. The cup holder 58 is configured to position a cup. In another embodiment, the cup holder 58 is positioned substantially equally distant from the pair of first bars 44, proximate to the top edge 42 of the second plate 14.

In yet another embodiment, a plurality of hooks 60 is coupled to and extends from the second side 40 of the second plate 14. The hooks 60 are configured to couple items, such as a bag, to the second plate 14. In still yet another embodiment, the plurality of hooks 60 comprises two hooks 60 that bracket the cup holder 58.

A fourth plate 62 is coupled to and extends transversely from the front edge 28 of the first plate 12. The fourth plate 62 is configured to retain feet of the user upon the first plate 12.

In use, the wheels 18 that are positioned on the first plate 12 are configured to locomote the first plate 12 across the surface. The first handle 26 that is positioned on the first plate 12 is configured to be grasped in the hands of the user, such as the child, who is positioned on the first plate 12 between the first handle 26 and the second plate 14. The third plates 54 are configured to retain the user on the first plate 12. The fourth plate 62 is configured to retain the feet of the user upon the first plate 12. The second handle 38 is configured to be clasped in the hands of the operator so that the operator is positioned to locomote the first plate 12, and the user who is positioned on the first plate 12, upon the wheels 18. The hooks 60 that are positioned on the second plate 14 are configured to couple the items, such as the bag, to the second plate 14. The cup holder 58 that is positioned on the second plate 14 is configured to position the cup. The first handle 26 is configured to be folded to position the first handle 26 adjacent to the first plate 12. The third plates 54 are configured to be folded to position the pair of third plates 54 adjacent to the seat 22 and the second plate 14. The first plate 12 and the second plate 14 are configured to be folded so that the first plate 12 and the second plate 14 are substantially adjacently positioned. Thus configured, the assembly 10 is collapsible.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A stand-up stroller assembly comprising:
   a first plate, said first plate being rigid;
   a second plate coupled to and extending substantially perpendicularly from a rear edge of said first plate, said second plate being rigid;
   a plurality of wheels axially coupled to said first plate;
   a seat hingedly coupled to a first side of said second plate, wherein said seat is positioned on said second plate such that said seat is selectively positionable in a resting configuration, wherein said seat is substantially perpendicular to said second plate and configured for seating a user, and a stowed configuration, wherein said seat is substantially parallel to and adjacent to said second plate;

a first handle coupled to said first plate proximate to a front edge of said first plate;
a second handle coupled to a second side of said second plate proximate to a top edge of said second plate; and
wherein said wheels are positioned on said first plate such that said wheels are configured for locomoting said first plate across a surface, wherein said first handle is positioned on said first plate such that said first handle is configured for grasping in hands of the user, such as a child, positioned on said first plate between said first handle and said second plate, wherein said second handle is positioned on said second plate such that said second handle is configured for clasping in hands of an operator such that the operator is positioned for locomoting said first plate and the user positioned on said first plate upon said wheels.

2. The assembly of claim 1, further including a pair of third plates, each said third plate being coupled to and extending between a respective said opposing edge of said second plate and a respective opposing side of said first plate, wherein said third plates are positioned on said first plate and said second plate such that said third plates are configured for retaining the user on said first plate.

3. The assembly of claim 2, further comprising:
said third plates being hingedly coupled to said second plate;
said first handle being hingedly coupled to said first plate;
said first plate and said second plate being hingedly coupled; and
wherein said third plates are positioned on said second plate such that each said third plate is configured for folding for positioning said pair of third plates adjacent to said seat and said second plate, wherein said first handle is positioned on said first plate such that said first handle is configured for folding for positioning said first handle adjacent to said first plate, wherein said second plate is positioned on said first plate such that said first plate and said second plate are configured for folding such that said first plate and said second plate are substantially adjacently positioned and such that said assembly is collapsible.

4. The assembly of claim 1, further including said first plate and said second plate being substantially rectangularly shaped.

5. The assembly of claim 4, further including said plurality of wheels comprising four said wheels positioned singly proximate each corner of said first plate, said wheels being treaded.

6. The assembly of claim 1, further including said first handle comprising a first rod and a second rod, said first rod being coupled to and extending substantially perpendicularly from said first plate, said second rod being coupled to and extending bidirectionally from said first rod distal from said first plate such that said first rod is positioned equally distant from opposing ends of said second rod.

7. The assembly of claim 6, further including said second rod being padded proximate to said opposing ends.

8. The assembly of claim 1, further including said first rod comprising a plurality of nested sections such that said first rod is selectively extensible.

9. The assembly of claim 8, further including said plurality of nested sections comprising three said nested sections.

10. The assembly of claim 6, further including said first rod and said second rod being substantially circularly shaped when viewed longitudinally.

11. The assembly of claim 1, further including each said first handle comprising a pair of first handles such that said first handles are configured for grasping in hands of two users positioned on said first plate.

12. The assembly of claim 1, further including said second handle comprising a pair of first bars, a pair of second bars, and a third bar, each said first bar being coupled proximate to and extending parallel to a respective opposing edge of said second plate proximate to said top edge, each said second bar being coupled to and extending substantially perpendicularly from a respective said first bar proximate to said top edge of said second plate, said third bar being coupled to and extending between said second bars distal from said first bars.

13. The assembly of claim 12, further including each said first bar comprising a plurality of nested segments such that said first bars are selectively extensible.

14. The assembly of claim 1, further including each said plurality of nested segments comprising two said nested segments.

15. The assembly of claim 12, further including said third bar being padded.

16. The assembly of claim 12, further including a cup holder coupled to and extending from said second side of said second plate, wherein said cup holder is positioned on said second plate such that said cup holder is configured for positioning a cup, said cup holder being positioned substantially equally distant from each of said pair of first bars proximate to said top edge of said second plate.

17. The assembly of claim 16, further including a plurality of hooks coupled to and extending from said second side of said second plate, wherein said hooks are positioned on said second plate such that said hooks are configured for coupling items, such as a bag, to said second plate, said plurality of hooks comprising two said hooks bracketing said cup holder.

18. The assembly of claim 1, further including a fourth plate coupled to and extending transversely from said front edge of said first plate, wherein said fourth plate is positioned on said first plate such that said fourth plate is configured for retaining feet of the user upon said first plate.

19. A stand-up stroller assembly comprising:
a first plate, said first plate being rigid, said first plate being substantially rectangularly shaped;
a second plate coupled to and extending substantially perpendicularly from a rear edge of said first plate, said second plate being rigid, said second plate being substantially rectangularly shaped, said first plate and said second plate being hingedly coupled, wherein said second plate is positioned on said first plate such that said first plate and said second plate are configured for folding such that said first plate and said second plate are substantially adjacently positioned;
a plurality of wheels axially coupled to said first plate, wherein said wheels are positioned on said first plate such that said wheels are configured for locomoting said first plate across a surface, said plurality of wheels comprising four said wheels positioned singly proximate each corner of said first plate, said wheels being treaded;
a seat hingedly coupled to a first side of said second plate, wherein said seat is positioned on said second plate such that said seat is selectively positionable in a resting configuration, wherein said seat is substantially perpendicular to said second plate and configured for seating a user, and a stowed configuration, wherein said seat is substantially parallel to and adjacent to said second plate;

a first handle coupled to said first plate proximate to a front edge of said first plate, wherein said first handle is positioned on said first plate such that said first handle is configured for grasping in hands of the user, such as a child, positioned on said first plate between said first handle and said second plate, said first handle being hingedly coupled to said first plate, wherein said first handle is positioned on said first plate such that said first handle is configured for folding for positioning said first handle adjacent to said first plate, said first handle comprising a first rod and a second rod, said first rod being coupled to and extending substantially perpendicularly from said first plate, said second rod being coupled to and extending bidirectionally from said first rod distal from said first plate such that said first rod is positioned equally distant from opposing ends of said second rod, said second rod being padded proximate to said opposing ends, said first rod comprising a plurality of nested sections such that said first rod is selectively extensible, said plurality of nested sections comprising three said nested sections, said first rod and said second rod being substantially circularly shaped when viewed longitudinally;

a second handle coupled to a second side of said second plate proximate to a top edge of said second plate, wherein said second handle is positioned on said second plate such that said second handle is configured for clasping in hands of an operator such that the operator is positioned for locomoting said first plate and the user positioned on said first plate upon said wheels, said second handle comprising a pair of first bars, a pair of second bars, and a third bar, each said first bar being coupled proximate to and extending parallel to a respective opposing edge of said second plate proximate to said top edge, each said second bar being coupled to and extending substantially perpendicularly from a respective said first bar proximate to said top edge of said second plate, said third bar being coupled to and extending between said second bars distal from said first bars, each said first bar comprising a plurality of nested segments such that said first bars are selectively extensible, each said plurality of nested segments comprising two said nested segments, said third bar being padded;

a pair of third plates, each said third plate being coupled to and extending between a respective said opposing edge of said second plate and a respective opposing side of said first plate, wherein said third plates are positioned on said first plate and said second plate such that said third plates are configured for retaining the user on said first plate, said third plates being hingedly coupled to said second plate, wherein said third plates are positioned on said second plate such that each said third plate is configured for folding for positioning said pair of third plates adjacent to said seat and said second plate;

a cup holder coupled to and extending from said second side of said second plate, wherein said cup holder is positioned on said second plate such that said cup holder is configured for positioning a cup, said cup holder being positioned substantially equally distant from each of said pair of first bars proximate to said top edge of said second plate;

a plurality of hooks coupled to and extending from said second side of said second plate, wherein said hooks are positioned on said second plate such that said hooks are configured for coupling items, such as a bag, to said second plate, said plurality of hooks comprising two said hooks bracketing said cup holder;

a fourth plate coupled to and extending transversely from said front edge of said first plate, wherein said fourth plate is positioned on said first plate such that said fourth plate is configured for retaining feet of the user upon said first plate; and wherein said wheels are positioned on said first plate such that said wheels are positioned for locomoting said first plate across the surface, wherein said first handle is positioned on said first plate such that said first handle is configured for grasping in the hands of the user, such as the child, positioned on said first plate between said first handle and said second plate, wherein said third plates are positioned on said first plate and said second plate such that said third plates are configured for retaining the user on said first plate, wherein said fourth plate is positioned on said first plate such that said fourth plate is configured for retaining feet of the user upon said first plate, wherein said second handle is positioned on said second plate such that said second handle is configured for clasping in hands of the operator such that the operator is positioned for locomoting said first plate and the user positioned on said first plate upon said wheels, wherein said hooks are positioned on said second plate such that said hooks are configured for coupling the items, such as the bag, to said second plate, wherein said cup holder is positioned on said second plate such that said cup holder is configured for positioning the cup, wherein said third plates are positioned on said second plate such that each said third plate is configured for folding for positioning said pair of third plates adjacent to said seat and said second plate, wherein said first handle is positioned on said first plate such that said first handle is configured for folding for positioning said first handle adjacent to said first plate, wherein said second plate is positioned on said first plate such that said first plate and said second plate are configured for folding such that said first plate and said second plate are substantially adjacently positioned and such that said assembly is collapsible.

20. The assembly of claim 19, further including each said first handle comprising a pair of first handles such that said first handles are configured for grasping in hands of two users positioned on said first plate.

* * * * *